(12) United States Patent
Stafford

(10) Patent No.: US 6,824,118 B1
(45) Date of Patent: Nov. 30, 2004

(54) MICRO-ADJUSTMENT FLOW CONTROL VALVE

(76) Inventor: Bryan W. Stafford, P.O. Box 6368, Torrance, CA (US) 90504

( * ) Notice: Subject to any disclaimer, the term of this patent is extended or adjusted under 35 U.S.C. 154(b) by 150 days.

(21) Appl. No.: 10/233,932

(22) Filed: Sep. 3, 2002

Related U.S. Application Data

(63) Continuation-in-part of application No. 09/875,552, filed on Jun. 7, 2001, now abandoned.

(51) Int. Cl.[7] .............................................. F16K 31/00
(52) U.S. Cl. ...................................... 251/205; 251/215
(58) Field of Search ................................ 251/205, 208, 251/215, 218, 121, 229, 264, 265, 274

(56) References Cited

U.S. PATENT DOCUMENTS

| 4,488,704 A | * | 12/1984 | Wicker | 251/265 |
|---|---|---|---|---|
| 4,513,779 A | * | 4/1985 | Owoc et al. | 251/335.3 |
| 4,688,601 A | * | 8/1987 | Astill | 251/265 |
| 4,778,149 A | * | 10/1988 | Pesovic et al. | 251/205 |
| 4,928,920 A | * | 5/1990 | Feild | 251/265 |
| 5,188,338 A | * | 2/1993 | Itoi | 251/265 |
| 5,419,530 A | * | 5/1995 | Kumar | 251/265 |
| 5,551,477 A | * | 9/1996 | Kanno et al. | 137/553 |
| 6,102,367 A | * | 8/2000 | Schmitz et al. | 251/265 |
| 6,540,205 B1 | * | 4/2003 | Stafford | 251/208 |

* cited by examiner

Primary Examiner—J. Casimer Jacyna
(74) Attorney, Agent, or Firm—Monty Koslover

(57) ABSTRACT

An addition of a fine adjustment flow-control mechanism that produces changes in fluid flow in increments of 0.1% or less, to any configuration high pressure fluid flow control valve that employs an axial valve stem and a rotatable rough control knob that moves the stem axially in increments of 1.0% or more, opening the valve flow chamber to fluid flow. The valve stem is designed and driven so that it does not rotate or twist, and particular provision is made to eliminate fine control drive tolerance build-up. These aspects produce a very high degree of adjustment accuracy during operation of the flow control valve.

3 Claims, 2 Drawing Sheets

2

MICRO-ADJUSTMENT FLOW CONTROL VALVE

This application is a continuation-in-part of Ser. No. 09/875,552 filed on Jun. 7, 2001 which is now abandoned and incorporated by reference.

BACKGROUND OF THE INVENTION

1. Field of the Invention

This invention relates to fluid flow control valves and more particularly to those valves for use in industrial systems requiring control of high pressure chemical and other fluids.

2. Background

There has long been a continuing use in the chemical industry and others for fluid control valves which are adapted for high pressure fluids, and that can be adjusted to accurately set flow to any percent of maximum flow rate at a fixed inlet pressure. Such fluid control valves are characterized as employing an axial plunger or stem and a manually rotatable knob to adjust the position of the plunger in the valve body. Setting the flow rate is effected by rotating the cap or knob to a marked position that corresponds to a given percentage of the maximum rated flow.

Several available fluid control valves have the capability of setting and roughly adjusting a flow rate to within a few percent, which has satisfied the process needs of many users in the past. However, a substantial number of present day users now require a finer flow control, allowing valve flow rate to be set at levels including a fraction of 1 percent. For example, at one part of a given mixing process, the required flow rate could be 15.7% with an accuracy of better than within +/−0.5% of rated maximum flow. This is difficult to obtain accurately with presently available rough flow control valves, although some valves have marked adjustments corresponding to 0.5% or less of flow rate. In industry practice, any valve having a flow adjustment capability of 1.0% steps, would be calibrated and flow rate set at the desired level prior to installing the valve in the system, to achieve the required process flow rate. This practice precludes any possibility of adjusting the flow rate after a valve is installed. There is therefore a need for a flow control valve that includes provision for micro or fine adjustment of fluid flow after the valve has been installed. The fine adjustment would be in 0.1% steps over a small range, in addition to the currently available rougher adjustment steps. For many research and development applications, a valve adjustment accuracy of better than within +/−0.3% of maximum flow rate is required. Therefore, an improvement in adjustment accuracy to better than within +/−0.3% of maximum flow rate is also needed.

SUMMARY OF THE INVENTION

A principal object of this invention is to provide a micro or fine adjustment means for controlling fluid flow, that comprises a combination of mechanical components which interact with the structure of a high pressure flow control valve to produce changes in the valve stem position and thereby in valve fluid flow, in steps of 0.1% of maximum valve flow rate. A secondary object is to increase the present accuracy of valve flow control settings to better than +/−0.3%. Further objects and advantages of the invention will be apparent from studying the following portion of the specification, the claims and the attached drawings.

DESCRIPTION OF THE PREFERRED EMBODIMENT

The invention is the addition of a fine adjustment flow-control mechanism that produces changes in fluid flow in increments of 0.1% or less, to any configuration high pressure fluid flow control valve that employs an axial valve stem and a rotatable rough control knob that moves the stem axially in increments of 1.0% or more, opening the valve flow chamber to fluid flow from inlet port to outlet port. The fine adjustment flow-control mechanism described herein includes an axial valve stem and a portion of the rough control knob, both of which are required to be particularly adapted in order to properly interact with the controlling parts of the mechanism. The interaction of the invention flow control mechanism with the rough control knob is designed to reduce the flow adjustment error to less than +/−0.3% of the full rated flow.

Figure 1:
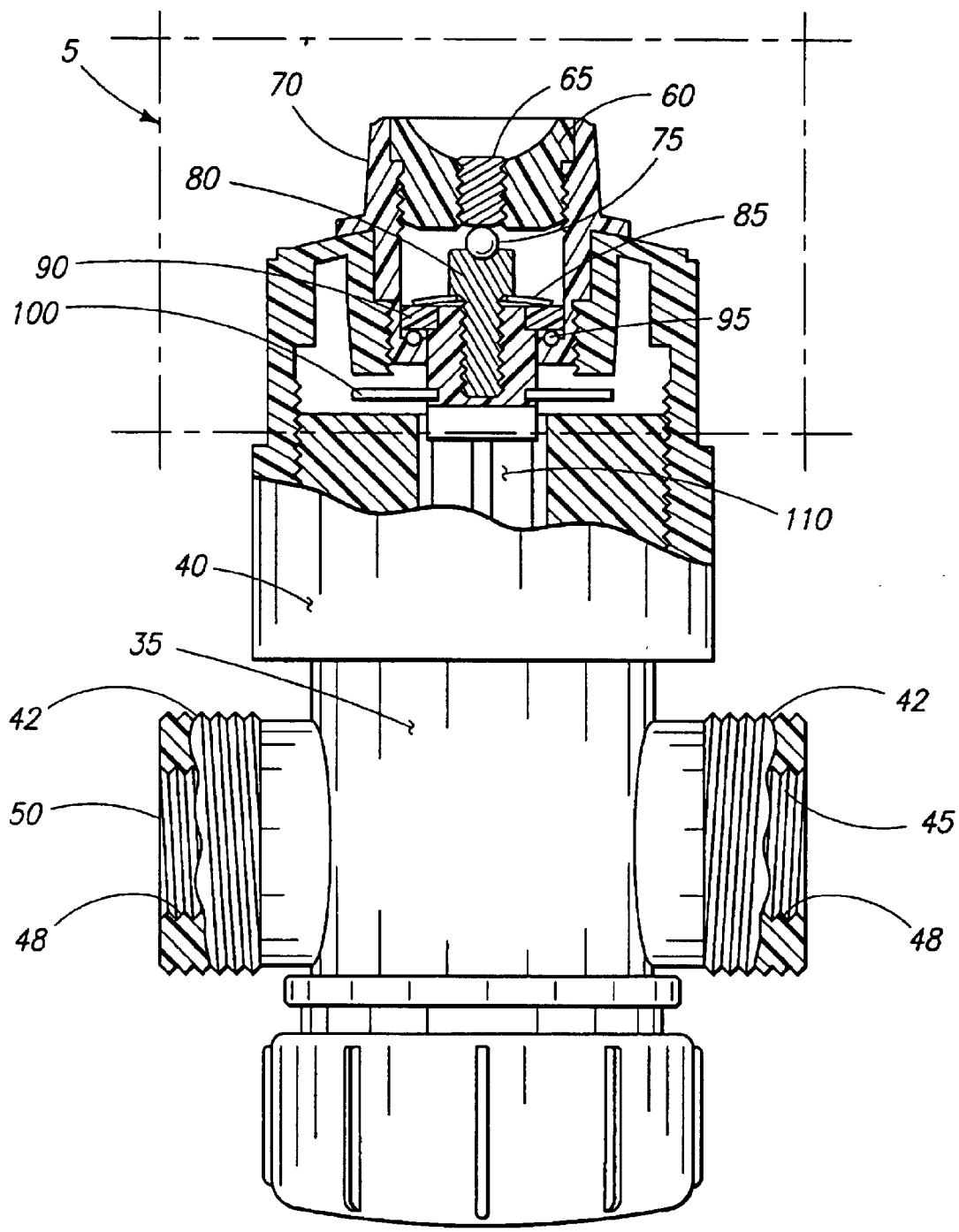
FIG. 1 is a partially cut-away elevation view of a fluid flow control valve, particularly showing in axial cross-section, a preferred embodiment of the fine adjustment flow-control mechanism according to the present invention.

Referring particularly to the drawings, there is shown in FIG. 1, a sectional view 5 of a preferred fine adjustment flow-control mechanism including the top of an adapted valve stem 110, as integrated in a typical configuration high pressure fluid flow control valve in accordance with the present invention.

In essence, the fine adjustment flow-control mechanism comprises a fine control assembly that can be separately rotated with respect to a rough control knob 40, a modified valve stem 110, and a means for supporting and holding the valve stem 110 to the fine control assembly without causing the valve stem 110 to be rotated.

A cylindrical cap member 60, an axial tightening setscrew 65 which screws into a top center threaded hole in the cap member 60, and a generally cylindrically shaped, tapered fine control knob 70 into which the cap member 60 is removably fastened, form a fine control assembly. This fine control assembly has a first threaded portion around its bottom section which is engaged to a second threaded portion of a central skirt attached to the top cover opening of the valve rough control knob 40. Using the threaded engagement, rotating the fine control knob 70 causes the assembly and the assembly supported valve stem 110 to be raised or lowered axially with respect to the rough control knob 40.

The top portion of the valve stem 110 is supported on ball bearings 95 and clamped using a ball 75 to the fine control assembly. It should be noted that there is no significant buildup of tolerance between interacting parts in the above described drive by the rough control knob 40 through the fine control mechanism to the valve stem 110. Furthermore, during any rough control knob flow rate adjustment or fine control knob adjustment, the valve stem 110 will not rotate in the valve body 35. Instead, the valve stem 110 moves up or down without forced rotation.

This innovation results in greatly improved accuracy in setting the valve flow rate, for the following reasons:

In the well known, available, high pressure fluid control valves, there exists a compounded vertical position error due to unavoidable clearances between the driving edges of the rough control knob and the driven edge or surface of the valve stem. When a valve stem is made to rotate by a rough control knob, the applied torque often causes the tight body-fitting valve stem to twist somewhat and not fully rotate, resulting in the stem taking up part or all of the vertical clearances. The valve stem position will be therefore off by the amount of the vertical clearances.

For a valve which incorporates the invention fine adjustment flow control mechanism described above, there is no valve stem twisting induced by applied torque, and consequently there is an increased accuracy in setting a flow rate. Further, there are no significant vertical clearances to be absorbed in the flow control mechanism. This results in a minimal adjustment error which is found to be no more than +/−0.3% of full rated flow.

This improvement is particularly important for small size valves, such as are used in research and development labs, where the vertical drive clearances form a greater portion of the valve chamber height than is the case for large valves.

The amount of stem displacement is directly related to the size of the helical threads on the bottom section of the fine control knob 70 and the number of threads that are turned when the knob is rotated. The size of the threads on the fine control knob 70 can be selected so that a full turn of one thread produces a 0.1% change in the valve chamber opening. Thus, ten rotations of the fine control knob 70 will produce a 1.0% change. This is the typical range of the fine adjustment control. However, the fine adjustment range may be extended to be 0 to 2.0% or 5.0% as needed.

The fine control assembly elements are shown in cross-section view in FIG. 1, and as described earlier, comprise a fine control knob 70, a cap member 60 which is removably fastened to the knob 70, and a set-screw 65 which is attached to the cap member 60.

The valve stem 110 includes a metal stop washer 100 for limiting travel of the stem with respect to the rough control knob 40. The top portion of the stem 110 is stepped, forming a shoulder and includes an axially threaded bore to receive a threaded bolt 80. This bolt 80 holds the valve stem 110 and is used together with a Belleville spring washer 85 and a support washer 90, as a means of supporting the valve stem 110 rotatably on a ring of bearing balls 95 which are located in a groove on an inner annular lip of the fine control knob 70 at its bottom end.

A support ball 75 for clamping the valve stem 110 to the fine control assembly, is located and seated in a recess in the top surface of the bolt 80, which is immediately under the set-screw 65. In assembly of the valve, the set-screw 65 is tightened to push down on the ball 75 and the bolt 80, so that the support washer 90 around the valve stem top bears hard on top of the ball bearings 95. There will therefore be no vertical play or slack between the fine control knob 70 and the valve stem at any time. Since the fine control knob 70 is engaged by close fitting small threads to the rough control knob 40, there is virtually no play or slack here either. The result is that overall control slack is eliminated and the accuracy of the valve control setting is enhanced to the greatest degree possible, using threaded controls.

In the view shown in FIG. 1, the fine control adjustment is at one limit of its range and the fine control knob 70 can not be used to lower the stem further. At this point, depending on the position of the rough control knob 40, the valve flow chamber may be completely closed or partly open to flow. Rotation of the fine control knob 70 can then be used to raise the valve stem 110 straight up until the stop washer 100 hits the lower edges of the central, internal portion of 10 the rough control knob 40. This sets the opposite or opening limit of the fine control, which may be 1.0% open or as much as 5.0% open in steps of 0.1%.

The valve chamber opening may be set by use of the rough control knob 40 to be fully or partially opened at any time. This is left to the operator's decision, so that the fine control adjustment may be used at any degree of valve chamber opening as is needed.

It is also apparent, therefore that the fine flow-control may be used alone without the rough control, to produce an accurate, small flow rate setting in the range of 0.0% to 5.0% in steps of 0.1%. This capability would be extremely difficult to achieve with currently available flow control valves that do not include fine control means.

Referring again to FIG. 1, another innovation is shown that is not related to the present fine control invention. This is the use of an outer set of screw threads 42 and an inner set of screw threads 48 to the valve inlet connector 45 and outlet connector 50. By these connections, two different sizes and diameter flow pipe connections can be accommodated by one flow control valve, and the number of different size valves required to be stocked can be reduced.

Figure 2:
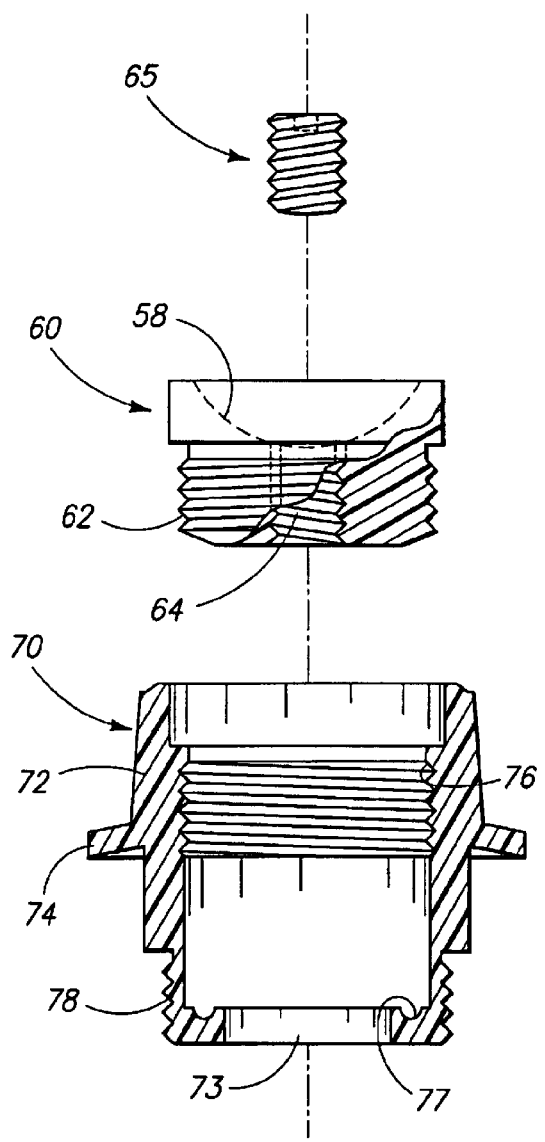
FIG. 2 shows three of the major components of the preferred embodiment fine adjustment flow-control mechanism in their nesting order, with two of the components partially or fully cut-away to show detail of structure.

Referring now to FIGS. 2 through 5, there are shown detailed views of all the components comprising the fine adjustment flow-control, excepting the washers 90,100 and support ball 75 which are standard, available parts. FIG. 2 is an exploded view of the parts constituting the fine control assembly; both the cap member 60 and the fine control knob 70 being partially or fully cut away to show internal detail. The cap member 60 includes a downwardly concave curved recess 58 in its top surface to provide easy access to the set-screw 65 that is screwed into an axial threaded hole 64 at the center of the cap member 60. Mutually threaded portions 62 and 76 are provided, respectively on the cap member 60 and the fine 5 control knob 70 for the purpose of removably fastening the cap member 60 in the top opening of the fine control knob 70.

The upper portion 72 of the fine control knob 70 has an outer surface suitable for manual gripping during adjustment, and includes, below the grip area, a peripheral mounting flange 74. The flange 74 serves as a positive stop to downward movement of the knob as it rotates. It also provides a surface on which to mark the angular positions of fine control knob rotation for determining flow adjustment.

An inwardly projecting annular lip 73, concentric with the knob vertical axis, is located at the bottom opening of the fine control knob 70. The surface of the lip 73 includes a circular groove 77 that is sized to seat ball bearings 95 as shown in FIG. 1. The outer diameter of the knob 70 lower portion is sized to fit snugly inside the top opening of the valve rough control knob 40, and includes a stepped bottom section having a first threaded portion 78.

The first threaded portion 78 has a screw thread peak-to-peak dimension equivalent to 0.1% of the height of the valve flow chamber, and a threaded length greater than 5% of the flow chamber height. This first threaded portion 78 mates with a matching second threaded portion surface that is located on the inner surface of an annular skirt which is attached to the top center of the rough control knob 40, and projects axially downwards. The mutual engagement of the above two threaded portions of the fine control knob 70 and rough control knob 40 as shown in FIG. 1, provides the means for raising or lowering the fine control knob 70 and thereby, the valve stem 110.

When the fine control knob 70 is rotated, the valve stem 110 is made to move up or down inside the valve body, opening or closing the valve flow chamber by an amount depending on the number of fine control knob rotations made.

Figure 3:
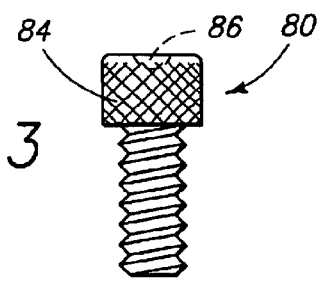
FIG. 3 is a side view of the stem tightening bolt, particularly indicating a recess in the top of the bolt head for seating a support ball.
Figure 4:
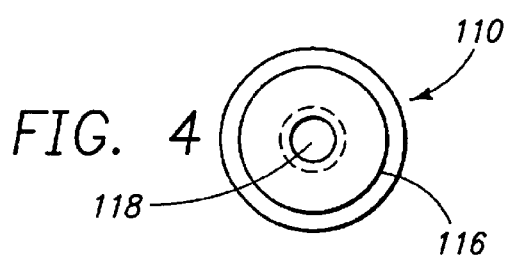
FIGS. 4 and 5 are respectively, a top view and side elevation view of a valve stem that is modified according to the present invention.
Figure 5:
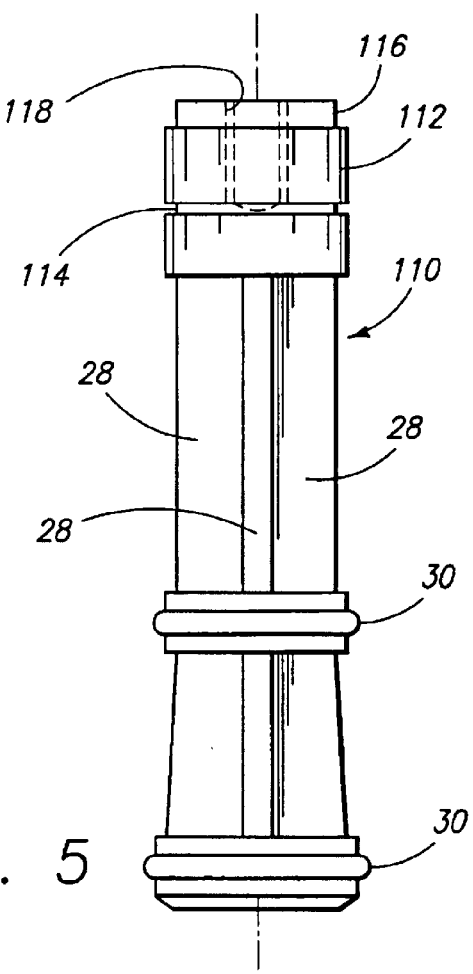

Referring now to FIGS. 3, 4 and 5, it is seen that there is a small recess 86 located in the top surface of the bolt head 84 to seat a support ball 75 as shown in FIG. 1.

The valve stem 110 includes four longitudinal, radially projecting ribs 28 for stiffening, a deep circumferential groove 114 in the stem top portion 112 for seating a stop washer 100, a top stepped section 116 for seating a support washer 90 and a threaded bore 118 in the top center of the valve stem, in which to fasten the stem holding bolt 80. In addition, two "O" rings 30 are provided to ensure a valve stem close fit in the valve body.

All the component parts of the preferred embodiment fine flow-control assembly are made from hard, rigid plastic, using the same materials as used for present industrial high pressure flow control valves. This aspect makes it easy to adapt any of the present high pressure control valve configurations to incorporate the invention fine control mechanism.

The preferred embodiment fine flow-control described above may be used in all sizes of flow control valves which are used in industrial laboratories and production facilities requiring accurate flow control as well as in research and development labs.

The foregoing described preferred embodiment fine control incorporated in a high pressure flow control valve, is seen as producing the greatest flow control accuracy attainable with presently available materials and techniques. As such, it should be welcomed by the many potential users who require great accuracy.

From the above description, it is clear that the preferred embodiment achieves the objects of the present invention. Alternative fine flow-control mechanisms and various modifications may be apparent to those skilled in the art. These alternatives and modifications are considered to be within the spirit and scope of the present invention.

Having described the invention, what is claimed is:

1. In a high pressure fluid flow control device that is used for making varying adjustments to a supply flow rate, said device including a valve body; a valve flow chamber inside said valve body; an inlet port and flow channel that extends through said valve body and said valve flow chamber to an outlet port, said valve flow chamber having a height and vertical cross-section area commensurate with a predetermined maximum fluid flow rate through said valve body; an axial bore for a valve stem through said valve body and extending to intersect said valve flow chamber; and a rough control knob comprising a substantially annular cylindrical shell containing a cylindrical internal cavity extending along a longitudinal axis, and an outwardly convex portion at one end forming a top cover, said top cover including a top circular opening to said cavity that is centered on said longitudinal axis of said shell, said rough control knob being rotatably attached to said valve body;

a fine adjustment flow control mechanism comprising:

(a) a fine control assembly comprising:

a generally cylindrically shaped, fine control knob; said fine control knob including an axial cylindrical cavity, a top opening to said cavity at one end and a bottom opening to said cavity at a distal end; said cavity having a stepped portion at one end connecting to said top opening, said bottom opening at said distal end being concentric with said cavity, said bottom opening having a smaller diameter than said cavity and forming an inwardly directed annular lip, said lip having a top circular surface and a bottom circular surface, said top circular surface including a circular groove that is sized to seat ball bearings;

said fine control knob being divided into an upper portion and a lower portion, said upper portion having a frusto-conical shape with an outer surface sized for manual gripping during flow adjustment, and including a peripheral extending flange around a bottom edge of said upper portion; said lower portion being divided into a top section and a stepped bottom section, said top section having an outer diameter sized to fit closely into said top circular opening of said rough control knob; said stepped bottom section including a circumferentially placed first threaded portion, said first threaded portion having a screw thread peak-to-peak dimension equivalent to 0.1% of the height of said valve flow chamber, and a threaded length greater than 5% of the height of said valve flow chamber;

a plurality of ball bearings that fit in said groove on said annular lip in said fine control knob;

a cylindrical cap member; said cap member having an outwardly directed circumferential shoulder defining an upper section and a stepped lower section; said upper section including an axially centered concave curved recess cut into a top surface, said lower section including an axial threaded first hole that extends completely through said lower section, opening to said recess in said top surface;

a set screw that screws into said first hole in said cap member; and first means for removably fastening said cap member axially to fine control knob;

(b) an elongated annular skirt; said skirt being attached at one end to said top circular opening in said top cover of said rough control knob, and projecting downward axially, said skirt including a second threaded portion around an inner surface near to a distal end, said second threaded portion matching said first threaded portion on said fine control knob for driving engagement of said fine control knob with said rough control knob;

(c) a valve stem, comprising a tapered rod body, two "O" rings and a rigid, metal first washer; said rod body including a multiplicity of longitudinal, radially projecting ribs for stiffening said rod body, a cylindrical top portion, a cylindrical center portion, a cylindrical bottom portion; said top portion having a stepped section which is formed around a top edge of said rod body, and including a peripheral deep groove which is located down at a selected distance from said top edge to hold said first washer in place to act as a stop against stem upward movement; said top portion also including a threaded bore axially in a top surface of said top portion; said center portion and said bottom portion both having a deep peripheral groove to seat an "O" ring; and (d) second means for supporting and holding said valve stem to said fine control knob, said second means including a rigid metal second washer, a Belleville spring washer, a threaded bolt having a head which includes a recess therein, and a support ball that is sized to fit partly in said recess; said top portion of said valve stem, first being inserted through and above said bottom opening of said fine control knob; then said second washer being seated on said stepped section on top of said valve stem; next said threaded bolt with said spring washer being screwed into said threaded bore in said valve stem until said spring washer is forced down hard against said second washer; said support ball then being set on said recess in said bolt, said cap member being fastened in place and said set screw being adjusted to push said support ball, said bolt and therefore said valve stem downwards, until said second washer bears hard against said ball bearings that are seated on said lip which is located around said bottom opening of said fine control knob; said fine control knob being able to rotate freely while supporting a non-rotating valve stem; said cap member, by applying downward pressure through said set-screw to said top portion of said valve stem, holding said valve stem securely to said lip on said fine control knob;

said fine control knob, when manually rotated with respect to said rough control knob, moving upwards or downwards with respect to said rough control knob and forcing said valve stem to move directly upwards or downwards in the valve bore in increments of 0.1% or less of maximum valve flow in relation to a prior valve stem opening position established by the use of said rough control knob.

2. The flow control mechanism as defined in claim 1, wherein said first means for removably fastening said cap member to said fine control knob includes a first threaded portion helically wound around said lower section of said cap member and a second threaded portion that is located in an upper part of said cavity in said fine control knob which is internally threaded; said first threaded portion and said second threaded portion being sized for mutual threaded engagement.

3. The high pressure fluid flow control device of claim 1, wherein said inlet port and said outlet port, each have an outer, peripheral threaded fastening portion and an internal diameter threaded fastening portion that are located at the projecting ends of said ports, providing for fastening of either one of two different diameter flow pipe connections.

* * * * *